United States Patent
Lin et al.

(10) Patent No.: US 10,095,821 B1
(45) Date of Patent: Oct. 9, 2018

(54) TRANSISTOR LEVEL LOW POWER VERIFICATION FOR MIXED SIGNAL CIRCUIT DESIGN

(71) Applicant: Cadence Design Systems, Inc., San Jose, CA (US)

(72) Inventors: Qingyu Lin, Pleasanton, CA (US); Nan Zhang, Beijing (CN); Kun Zhang, Beijing (CN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 102 days.

(21) Appl. No.: 15/277,984

(22) Filed: Sep. 27, 2016

(51) Int. Cl.
 *G06F 17/50* (2006.01)
(52) U.S. Cl.
 CPC .................................. *G06F 17/504* (2013.01)
(58) Field of Classification Search
 CPC ........................................................ G06F 17/504
 USPC .......................................................... 716/109
 See application file for complete search history.

(56) References Cited

U.S. PATENT DOCUMENTS

| | | | | |
|---|---|---|---|---|
| 8,682,631 B2* | 3/2014 | Chang | ................. | G06F 17/5036 703/13 |
| 8,732,630 B1* | 5/2014 | Kolpekwar | .... | G01B 31/318314 716/101 |
| 8,949,753 B1* | 2/2015 | Kolpekwar | ......... | G06F 17/5036 716/106 |
| 9,141,741 B1* | 9/2015 | Lin | ........................ | G06F 17/505 |
| 9,501,592 B1* | 11/2016 | Kolpekwar | ......... | G06F 17/5036 |
| 9,529,948 B2* | 12/2016 | De | ...................... | G06F 17/5045 |
| 9,703,921 B1* | 7/2017 | Lin | ..................... | G06F 17/5081 |
| 2006/0259879 A1* | 11/2006 | Chetput | ............... | G06F 17/505 716/103 |
| 2011/0054875 A1* | 3/2011 | Chang | ................ | G06F 17/5036 703/14 |
| 2011/0161900 A1* | 6/2011 | Ginetti | ............... | G06F 17/5022 716/106 |
| 2013/0338991 A1* | 12/2013 | Lin | ..................... | G06F 17/5036 703/14 |

\* cited by examiner

*Primary Examiner* — Suchin Parihar
(74) *Attorney, Agent, or Firm* — Schwegman Lundberg & Woessner, P.A.

(57) ABSTRACT

Electronic design automation systems, methods, and computer readable media are presented for the generation of power-related connectivity data by an analog simulator (for example, by propagating the power supply data and/or ground data through the circuit components of the analog design schematic). In some embodiments, the verification module determines consistency between different versions of power-related connectivity data, such as: (i) power-related connectivity data from the analog design schematic and (ii) power-related connectivity data from the power-related data characterizing the mixed-signal design. Such verification determines whether the mixed-signal design satisfies the low power specification as expressed in the power-related data characterizing the mixed-signal design.

19 Claims, 11 Drawing Sheets

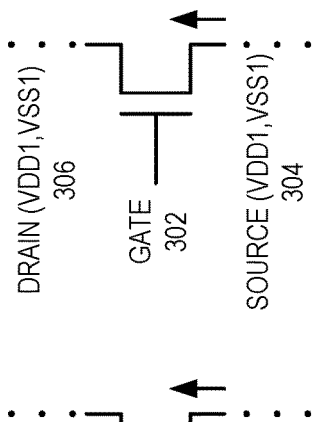
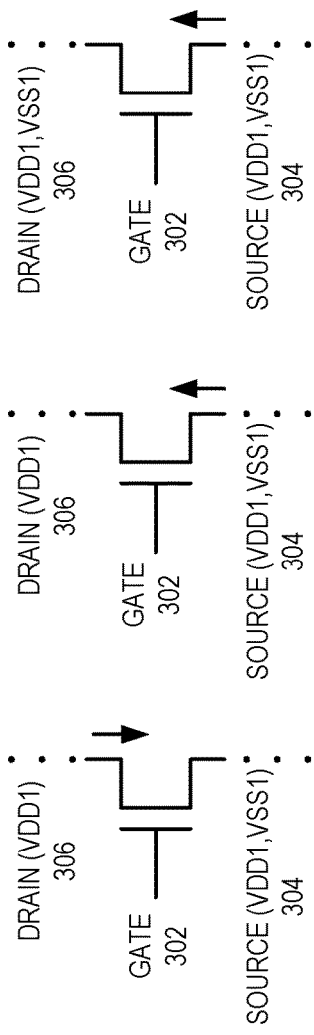
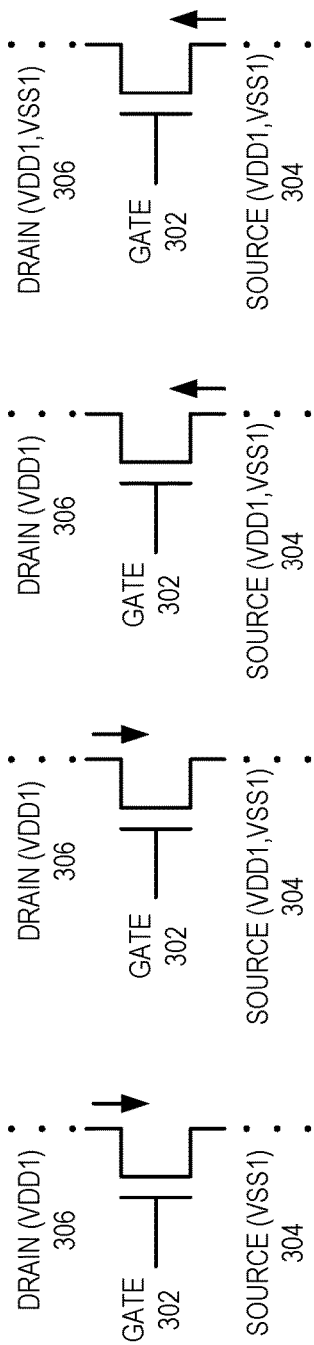
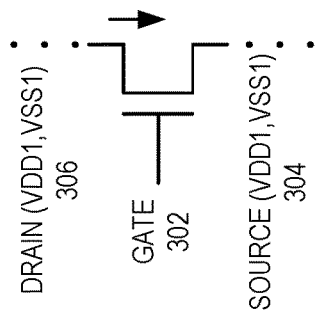
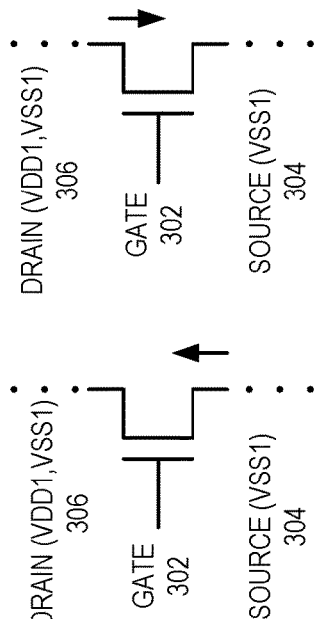
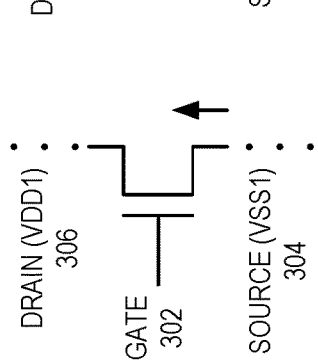

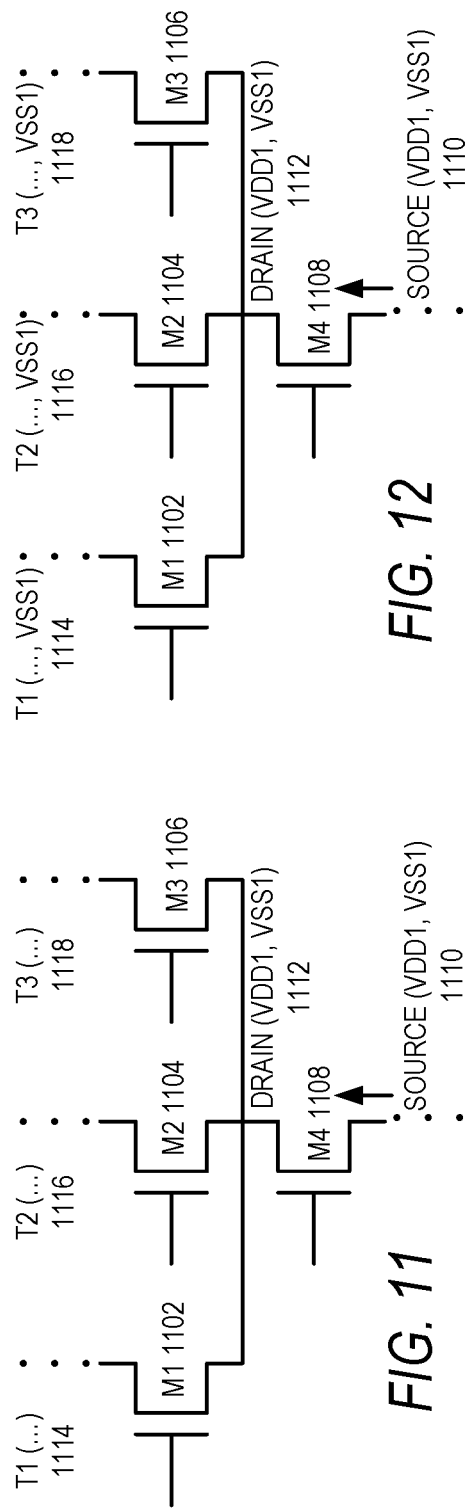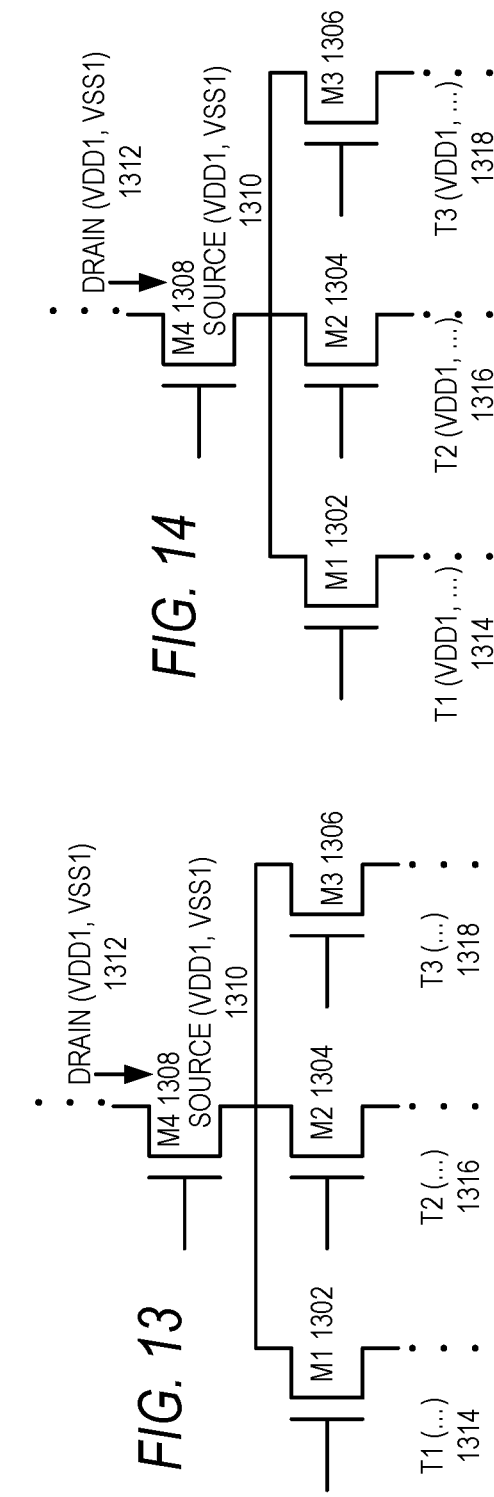

*FIG. 15*

| Node | Power supply | Ground |
|---|---|---|
| N1 | VDD1 | VSS1 |
| N2 | VDD2 | VSS2 |
| N3 | VDD1 | VSS1 |
| N4 | VDD1/VDD2 | VSS1/VSS2 |

*FIG. 16*

| Device | Terminal 1 | Terminal 2 | Terminal 3 |
|---|---|---|---|
| M1 | (VDD1,VSS1) | (VDD2,VSS2) | (VDD1,VSS1) |
| M2 | (VDD2,VSS2) | (VDD2,VSS2) | (VDD2,VSS2) |
| M3 | (VDD1,VSS1) | (VDD1,VSS1) | (VDD1,VSS1) |
| M4 | (VDD1/VDD2, VSS1/VSS2) | (VDD2,VSS2) | (VDD1/VDD2, VSS1/VSS2) |

| Node | Power supply | Ground |
|---|---|---|
| ... | ... | ... |
| BOUNDARY PORT OUT | VDD3 | VSS3 |
| ... | ... | ... |

FIG. 18

```
set_macro_model macro_INV3
create_power_domain -name port -boundary_ports {OUT} -default
end_macro_model macro_INV3 set_instance ... -domain_mapping {{port PD3}} update_power_domain -name PD3 -primary_power_net VDD3
```

FIG. 19

| Device | Terminal 1 | ... | Terminal 2 | ... | Terminal 3 | ... |
|---|---|---|---|---|---|---|
| ... | | | | | | |
| LS.M1 | (VDD3,VSS3) | | (VDD2,VSS2) | | (VDD3,VSS3) | |
| LS.M2 | (VDD3,VSS3) | | (VDD2,VSS2) | | (VDD3,VSS3) | |
| ... | | | | | | |

US 10,095,821 B1

TRANSISTOR LEVEL LOW POWER VERIFICATION FOR MIXED SIGNAL CIRCUIT DESIGN

TECHNICAL FIELD

Embodiments described herein relate to electronic design automation (EDA), and to systems, methods, devices, and instructions for verification of low power mixed-signal circuit designs.

BACKGROUND

An important consideration in integrated circuit (IC) design is conserving power in the manufactured IC. Accordingly, EDA tools support power conservation in IC design. Traditionally, the EDA design flow and associated EDA tools have focused on either analog design or digital design. Consequently, EDA tools for mixed-signal designs with both analog and digital design blocks have treated mixed-signal designs as an analog design supplemented with a digital black box, or a digital design supplemented with an analog black box. Treating the analog design block or digital design block as a black box ignores interaction between the analog and digital designs, such as multiple feedback loops and other complex interactions. One such interaction relates to the implementation of low power design with mixed-signal designs. An oversimplified verification of the mixed-signal IC design may fail to ensure that the manufactured mixed-signal IC design meets the low power design requirements when the IC design is taped out and ultimately fabricated.

In one approach, to more accurately perform verification on a mixed-signal IC design, a transient simulation simulates the time-varying behavior of the mixed-signal IC design circuit in the time domain. States or values are measured in the target design, and alerts are triggered by assertions in assertion-based verification to indicate a success or a failure of the mixed-signal IC design to meet a low power design requirement. In this approach, the transient simulation is time-consuming and may not be able to exhaust all possible input-output combinations. Also, in this approach, the circuit designer carries the burden of creating an assertion to verify each low power design requirement.

In another approach, to more accurately perform verification on a mixed-signal IC design, a formal verification tool determines whether the mixed-signal IC design meets low power design requirements. Because the formal verification tool is designed for performing verification on digital circuit designs, any analog circuit design blocks are converted in order be compatible with the formal verification tool. This conversion process not only places a burden on the circuit designer, but it also has multiple points of introducing error into the formal verification.

BRIEF DESCRIPTION OF THE DRAWINGS

The drawings illustrate example embodiments of the present disclosure and do not limit the scope of the present disclosure.

FIGS. 3-10 are examples of propagating supply data and ground data through a portion of an analog schematic.

FIGS. 11-14 are additional examples of propagating supply data and ground data through a portion of an analog schematic.

FIG. 15-16 are examples of an electrical node table and a circuit component table generated from a portion of an analog schematic, where each table contains power-related connectivity data.

FIG. 18 is an excerpt from an example of an electrical node table generated from propagating supply data through a portion of the analog schematic in FIG. 17.

FIG. 19 is an excerpt of an example of power-related data characterizing the mixed-signal design that includes the analog schematic of FIG. 17.

DETAILED DESCRIPTION

Figure 1:
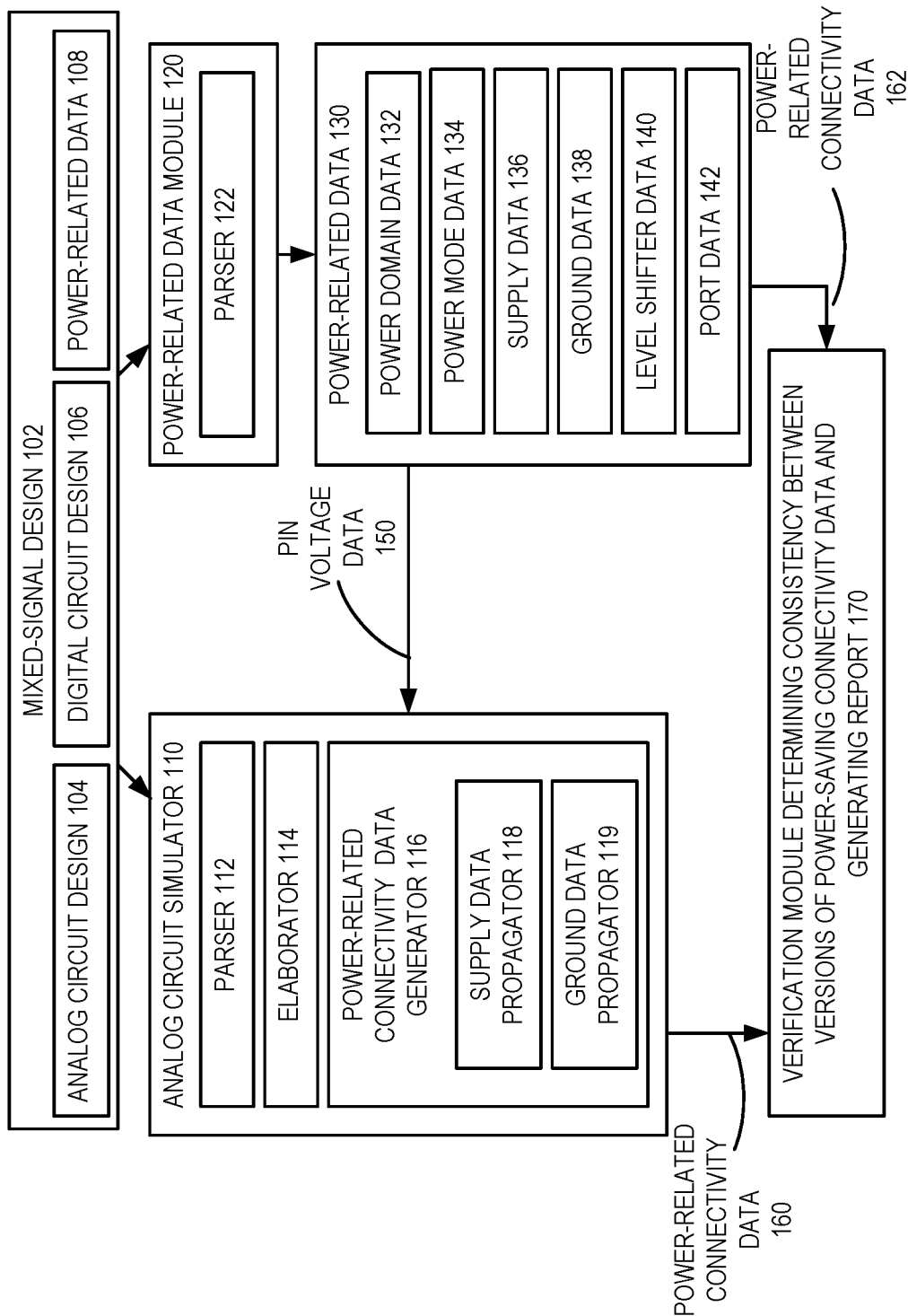
FIG. 1 is a diagram illustrating one possible EDA verification process flow for a mixed-signal design that generates power-related connectivity data from an analog schematic of the analog circuit portion of the mixed-signal design.

Example embodiments described herein relate to methods, computer readable media, and devices used for performing low power verification on a mixed-signal design including both an analog circuit portion and a digital circuit portion. While certain example embodiments are discussed, it will be apparent that other embodiments not specifically described herein, including embodiments propagating power supply and/or ground data in an analog circuit portion of a mixed-signal design at various stages of a circuit design, are attainable within the scope of the innovations presented herein. The following description and drawings illustrate specific embodiments to enable those skilled in the art to practice the specific embodiments. Other embodiments incorporate specific structural, logical, electrical, process, and/or other changes. In further embodiments, portions and/or features of some embodiments are included in, or substituted for, portions and/or features of other embodiments. Elements of the embodiments described herein cover all available equivalents of the described elements.

In some embodiments, an analog simulator automatically generates power-related connectivity data for a mixed-signal design from the analog design schematic of the analog portion in the mixed-signal design, and a verification module automatically determines whether the mixed-signal design satisfies the low power specification as expressed in the power-related data characterizing the mixed-signal design. In some embodiments, the power-related data characterizing the mixed-signal design is in a low power specification format such as Common Power Format (CPF), Unified Power Format (UPF), or IEEE-1801. The verification module determines consistency between different versions of power-related connectivity data, such as: (i) power-related connectivity data from the analog design schematic and (ii) power-related connectivity data from the power-related data characterizing the mixed-signal design. An example of power-related connectivity data is a list of nodes with the power supply data and/or ground data for nodes in the list. Another example of power-related connectivity data is a list of circuit components such as transistors, with the power supply data and/or ground data for terminals of the circuit components in the list. In some embodiments, the power-related connectivity data is generated by the analog simulator propagating the power supply data and/or ground data through the circuit components of the analog design schematic. The circuit designer is thereby freed from the burden of creating an assertion to verify each low power design requirement. In other embodiments, the analog simulator automatically generates only some of the power-related connectivity data. In such embodiments, although the circuit designer is not freed from the burden of creating an assertion to verify each low power design requirement, the burden is lightened to the extent that the analog simulator automatically generates the power-related connectivity data.

In some embodiments, the analog simulator uses the analog circuit design of the mixed-signal design as input. Because the analog circuit design is used in the analog simulator, fewer points of error are introduced into the verification as compared to a formal verification that converts the analog circuit design. In other embodiments, when the analog simulator generates power-related connectivity data, the analog simulator operates on a converted or otherwise modified version of the analog circuit design, such as schematic to netlist, netlist to schematic, hardware description language (HDL) to schematic, and HDL to netlist. In such embodiments, although an additional point of error is introduced, the power-related connectivity data is generated automatically. In addition, when the analog simulator generates power-related connectivity data, transient simulation becomes optional, such that low power verification is less computationally demanding.

FIG. 1 is a diagram illustrating an example EDA verification process flow for a mixed-signal design that generates power-related connectivity data from an analog schematic of the analog portion of the mixed-signal design. To ensure that a circuit design works as planned, a design team performs verification on the circuit design to determine whether the circuit meets the requirements of the circuit design's specification.

In FIG. 1, a mixed-signal design 102 is a combination of an analog circuit design 104 and a digital circuit design 106. The mixed-signal design 102 also has power-related data 108 to implement low power design into the mixed-signal design 102. In some embodiments the digital circuit design 106 is in a hardware description language such as Verilog and Very High Speed Integrated Circuit Hardware Description Language (VHDL). In other embodiments, the digital circuit design 106 has been synthesized into a gate-level description.

In some embodiments, the analog circuit design 104 is an analog design schematic. An analog design schematic is a pre-layout transistor level design that shows circuit components such as transistors, diodes, resistors, capacitors, and/or inductors. In the analog design schematic, circuit components are represented by symbols, and the terminals of the circuit components are represented by multiple pins of the symbols. The analog design schematic shows wires that connect the pins of particular circuit components to other pins of the same circuit component, one or more pins of one or more different circuit components, one or more power supply pins, and/or one or more ground pins. Cadence Virtuoso Schematic Editor is an example of an analog design schematic creator. In another embodiment, the analog circuit design 104 is a netlist.

Power-related data 108 typically expresses a power intent specification in text form and complies with a power intent specification format, such as CPF or UPF (e.g., the Accellera UPF1.0, IEEE 1801 aka UPF2.0) standards.

Analog circuit simulator 110 receives the analog circuit design 104 and generates the power-related connectivity data 160. Parser 112 is a front end that processes the analog circuit design 104 for use by the analog circuit simulator 110, and attempts to resolve incompatibilities for the analog circuit design 104 to be input for the analog circuit simulator 110. Elaborator 114 takes the output of parser 112. Elaborator 114 constructs a hierarchy based on the instantiation and configuration information in the analog circuit design 104, establishes connectivity among the circuit components of the analog circuit design 104, and computes the initial values for all of the objects in the analog circuit design 104. Power-related connectivity generator 116 includes a supply data propagator 118 and ground data propagator 119 that result in the power-related connectivity data 160 output from analog circuit simulator 110. Example operations of the supply data propagator 118 and ground data propagator 119 are discussed below.

Power-related data module 120 has a parser 122 that parses the power-related data 108 to extract power-related data 130. Power-related data 130 includes, for example, power domain data 132, power mode data 134, supply data 136, ground data 138, level shifter data 140 and port data 142. Some embodiments have isolation cells that isolate part of a circuit design when a signal driver is switched off but any signal receivers are still on, and/or isolate part of a circuit design when a signal driver is switched on but any signal receivers are still off.

Power-related data 130 allows more than one technique for power optimization. Power domain data 132 specifies power domains that have a same set of power switching characteristic for a particular part of the mixed-signal design 102. In some embodiments, a mixed-signal design 102 uses more than one power supply voltage, specified in supply data 136, and more than one ground, specified in ground data 138. In other embodiments, a ground in the present paper is replaced by a nonzero voltage that is lower than the power supply voltage. Power mode data 134 specifies power modes with a different set of power supply and ground voltages for a power domain. In one example of multiple power modes for a particular power domain, the particular power domain has a first high power mode when the particular part of the mixed-signal design 102 is fully on, a second low power mode when the particular part of the mixed-signal design 102 is on standby, and a third low power mode when the particular part of the mixed-signal design 102 is off. Other examples have fewer or more power modes, and/or different power modes. Port data 142 specifies ports of circuit blocks that connect to other circuit blocks, power supply voltages, and/or grounds. Power-related connectivity data 162 includes at least part of the power-related data 130.

Pin voltage data 150 from the power-related data 130 is received by analog circuit simulator 110, such that the supply data propagator 118 can propagate power supply data and such that the ground data propagator 119 can propagate ground data.

Verification module 170 determines consistency between multiple versions of power-related connectivity, such as power-related connectivity data 160 from analog circuit simulator 110 and power-related connectivity data 162 from power-related data 130. Verification module 170 generates a report on the consistency or lack thereof. Cadence AMS Designer is an example of a combined mixed-signal simulator, including an analog circuit simulator, and verification tool. Other embodiments separate the analog circuit simulator 110 and verification module 170.

Figure 2:
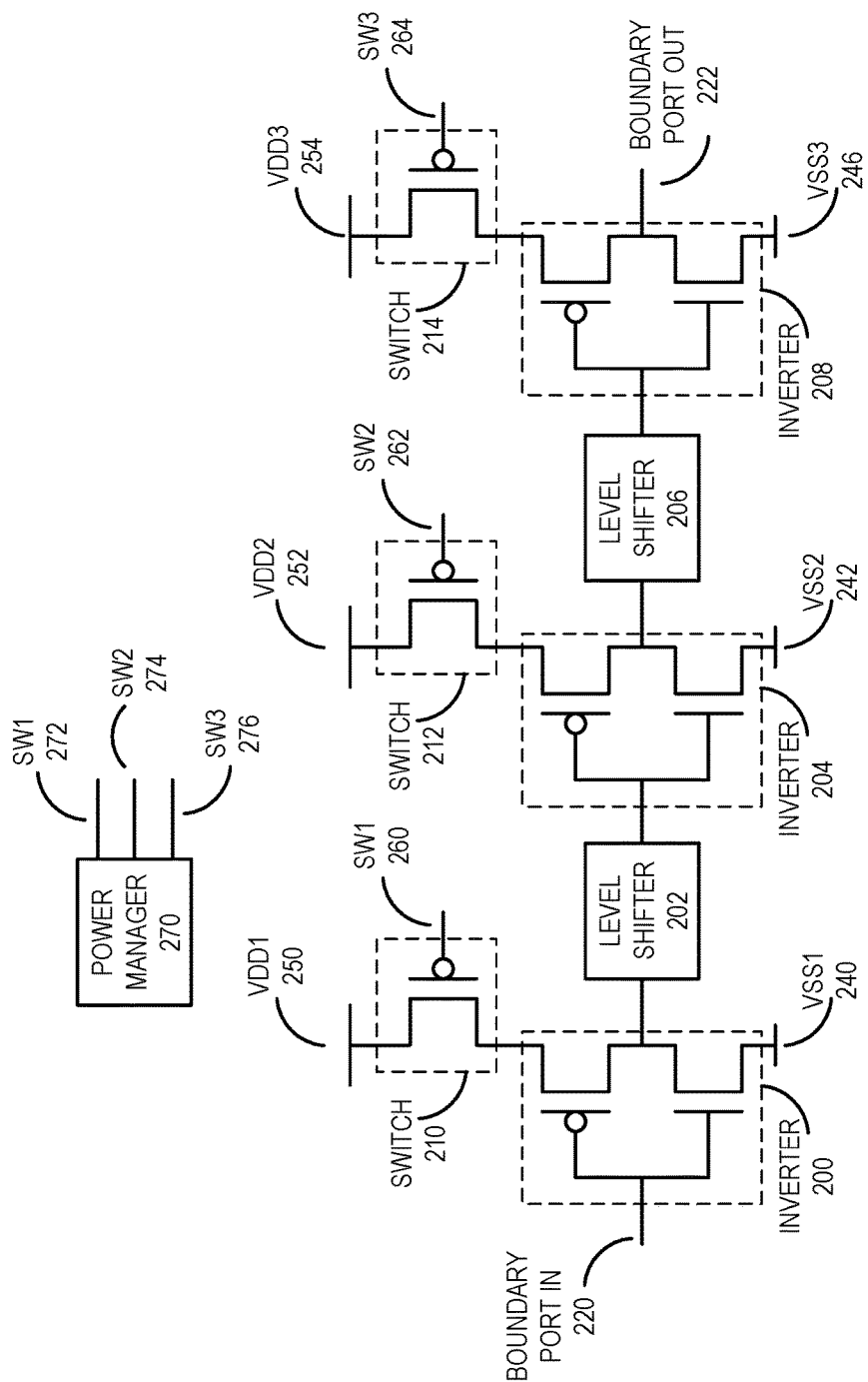
FIG. 2 is a diagram illustrating an example analog schematic of an analog circuit portion of the mixed-signal design.

FIG. 2 is a diagram illustrating an example analog schematic of an analog circuit portion of the mixed-signal design.

The signal flow of the analog circuit portion begins at the extreme left with boundary port in 220 and ends at the extreme right with boundary port out 222. In between boundary port in 220 and boundary port out 222, the analog circuit portion includes, in series, inverter 200, level shifter 202, inverter 204, level shifter 206, and inverter 208. Inverter 200 belongs to a first power domain, and is electrically coupled to ground VSS1 240 and to power supply VDD1 250 through switch 210. Inverter 204 belongs to a second power domain, and is electrically coupled to ground VSS2 242 and to power supply VDD2 252 through switch 212. Inverter 208 belongs to a third power domain, and is electrically coupled to ground VSS3 246 and to power supply VDD3 254 through switch 214. Power to circuits in the first power domain is controlled by SW1 260. Power to circuits in the second power domain is controlled by SW2 262. Power to circuits in the third power domain is controlled by SW3 264. Power to the multiple domains is controlled by power manager 270 with outputs SW1 272, SW2 274, and SW3 276, respectively controlling SW1 260, SW2 262, and SW3 264. An example of generating power-related connectivity data in the example analog schematic of FIG. 2 is discussed below, following a discussion of the propagation of power supply data and the propagation of ground data.

Other embodiments have an analog schematic with differences in the analog circuit, ports, power domains, power modes, power management controls, power supplies, and/or grounds. Differences in the analog circuits include differences in the circuit components and the connections among the circuit components and the power supplies and grounds.

FIGS. 3-10 are examples of propagating supply data and ground data through a portion of an analog schematic. Power-related connectivity data propagates through a first circuit component and then through a second circuit component electrically connected in series with the first circuit component. The first circuit component and the second circuit component each have a terminal at a same electrical node. A transistor has gate 302, source 304, and drain 306. The ellipses indicate that additional circuit components are optionally coupled to the source 304 and the drain 306, such that supply data and ground data are iteratively propagated through the additional circuit components prior to reaching the source 304 and the drain 306 of the shown transistor. An analog circuit simulator has sufficient information about the operational characteristics of the circuit components, in this example a transistor, to electrically connect terminals of the device, in this example source 304 and drain 306, in response to a sufficient gate voltage at gate 302. Such possible electrical connection between nodes informs the analog circuit simulator 110 to allow the propagation of supply data and ground data through the transistor.

FIGS. 3-6 show the propagation of supply data, followed by the propagation of ground data. In FIG. 3, the power-related connectivity data of the source 304 includes ground data VSS1. The power-related connectivity data of the drain 306 includes power supply data VDD1. The arrow shows the direction of power-related connectivity data propagation from power supply to ground, in this case from drain to source. In FIG. 4, power-related connectivity data of the drain 306 propagates through the transistor to the source 304, resulting in the power-related connectivity data of the source 304 including, in addition to ground data VSS1, also power supply data VDD1. In FIG. 5, the arrow shows the direction of power-related connectivity data propagation from ground to power supply, in this case from source to drain. In FIG. 6, power-related connectivity data of the source 304 propagates through the transistor to the drain 306, resulting in the power-related connectivity data of the drain 306 including ground data VSS1 in addition to power supply data VDD1.

FIGS. 7-10 show the propagation of ground data, followed by the propagation of supply data. In FIG. 7, the power-related connectivity data of the source 304 includes ground data VSS1. The power-related connectivity data of the drain 306 includes power supply data VDD1. The arrow shows the direction of power-related connectivity data propagation from ground to power supply, in this case from source to drain. In FIG. 8, power-related connectivity data of the source 304 propagates through the transistor to the drain 306, resulting in the power-related connectivity data of the drain 306 including, in addition to power supply data VDD1, also ground data VSS1. In FIG. 9, the arrow shows the direction of power-related connectivity data propagation from power supply to ground, in this case from drain to source. In FIG. 10, power-related connectivity data of the drain 306 propagates through the transistor to the source 304, resulting in the power-related connectivity data of the source 304 including power supply data VDD in addition to ground data VSS1.

In other embodiments, supply data and ground data propagate through different circuit components, such as capacitors, inductors, and resistors, bipolar junction transistors (BJTs), and memristors. Although n-type field effect transistors (FETs) are shown, in other embodiments, supply data and ground data propagate through p-type FETs. Although propagation of supply data and propagation of ground data are shown, in other embodiments, propagation of supply data is performed but not propagation of ground data. In yet other embodiments, propagation of ground data is performed but not propagation of supply data.

FIGS. 11-14 are additional examples of propagating supply data and ground data through a portion of an analog schematic. Power-related connectivity data propagates through a first circuit component and then through multiple circuit components. The first circuit component and the multiple circuit components each have a terminal at a same electrical node.

FIGS. 11-12 show the propagation of ground data. Transistor M4 1108 has a source 1110 and a drain 1112, both with power-related connectivity data including power supply data VDD1 and ground data VSS1. Transistors M1 1102, M2 1104, and M3 1106 respectively have terminals T1 1114, T2 1116, and T3 1118 with incomplete power-related connectivity data as shown by ellipses. In FIG. 11, the arrow shows the direction of power-related connectivity data propagation from ground to power supply. In FIG. 12, power-related connectivity data of the drain 1112 of transistor M4 1108 propagates through the transistor M1 1102, transistor M2 1104, and transistor M3 1106. The respective terminals T1

1114, T2 1116, and T3 1118 are each supplemented with power-related connectivity data of the ground data VSS1.

FIGS. 13-14 show the propagation of power supply data. Transistor M4 1308 has a source 1310 and a drain 1312, both with power-related connectivity data including power supply data VDD1 and ground data VSS1. Transistors M1 1302, M2 1304, and M3 1306 respectively have terminals T1 1314, T2 1316, and T3 1318 with incomplete power-related connectivity data as shown by ellipses. In FIG. 13, the arrow shows the direction of power-related connectivity data propagation from power supply to ground. In FIG. 14, power-related connectivity data of the source 1310 of transistor M4 1308 propagates through the transistor M1 1302, transistor M2 1304, and transistor M3 1306. The respective terminals T1 1314, T2 1316, and T3 1318 are each supplemented with power-related connectivity data of the power supply data VDD1.

Other embodiments have other types of circuit components, combinations of different circuit components, and/or quantities of circuit components.

FIG. 15-16 are examples of an electrical node table and a circuit component table generated from a portion of an analog schematic, where each table contains power-related connectivity data.

FIG. 15 is an example of an electrical node table that is generated by propagating power-related connectivity data in both the supply-to-ground direction and the ground-to-supply direction. The power-related connectivity data of node N1 includes power supply data VDD1 and ground data VSS1. The power-related connectivity data of node N2 includes power supply data VDD2 and ground data VSS2. The power-related connectivity data of node N3 includes power supply data VDD1 and ground data VSS1. The power-related connectivity data of node N4 includes power supply data VDD1/VDD2 and ground data VSS1/VSS2. Power supply data and ground data with multiple values, such as with node N4, indicate multiple power modes of a power domain. Other examples have a different number of power modes, multiple values for the power supply data but not the ground data, multiple values for the ground data but not the power supply data, and/or different quantities of data for ground data and the power supply data.

FIG. 16 is an example of a circuit component table that is generated by propagating power-related connectivity data in both the supply-to-ground direction and the ground-to-supply direction. In FIG. 16, the circuit component table lists 3-terminal transistor devices. Other embodiments include different devices and/or devices with a different number of terminals. The power-related connectivity data of transistor device M1 includes power supply data VDD1 and ground data VSS1 for terminal 1, power supply data VDD2 and ground data VSS2 for terminal 2, and power supply data VDD1 and ground data VSS1 for terminal 3. The power-related connectivity data of transistor device M2 includes power supply data VDD2 and ground data VSS2 for terminal 1, power supply data VDD2 and ground data VSS2 for terminal 2, and power supply data VDD2 and ground data VSS2 for terminal 3. The power-related connectivity data of transistor device M3 includes power supply data VDD1 and ground data VSS1 for terminal 1, power supply data VDD1 and ground data VSS1 for terminal 2, and power supply data VDD1 and ground data VSS1 for terminal 3. The power-related connectivity data of transistor device M4 includes power supply data VDD1/VDD2 and ground data VSS1/VSS2 for terminal 1, power supply data VDD2 and ground data VSS2 for terminal 2, and power supply data VDD1/VDD2 and ground data VSS1/VSS2 for terminal 3. Power supply data and ground data with multiple values, such as with transistor device M4, indicate multiple power modes of a power domain. Other examples have a different number of power modes, multiple values for the power supply data but not the ground data, multiple values for the ground data but not the power supply data, and/or different quantities of data for ground data and the power supply data.

A data value of an electrical node table and a circuit component table is valid for a particular power mode. Additional data values of the electrical node table and the circuit component table are valid for additional power modes. To generate the power supply data and ground data, the propagation of power supply data and ground data is repeated for the different power modes.

Figure 17:
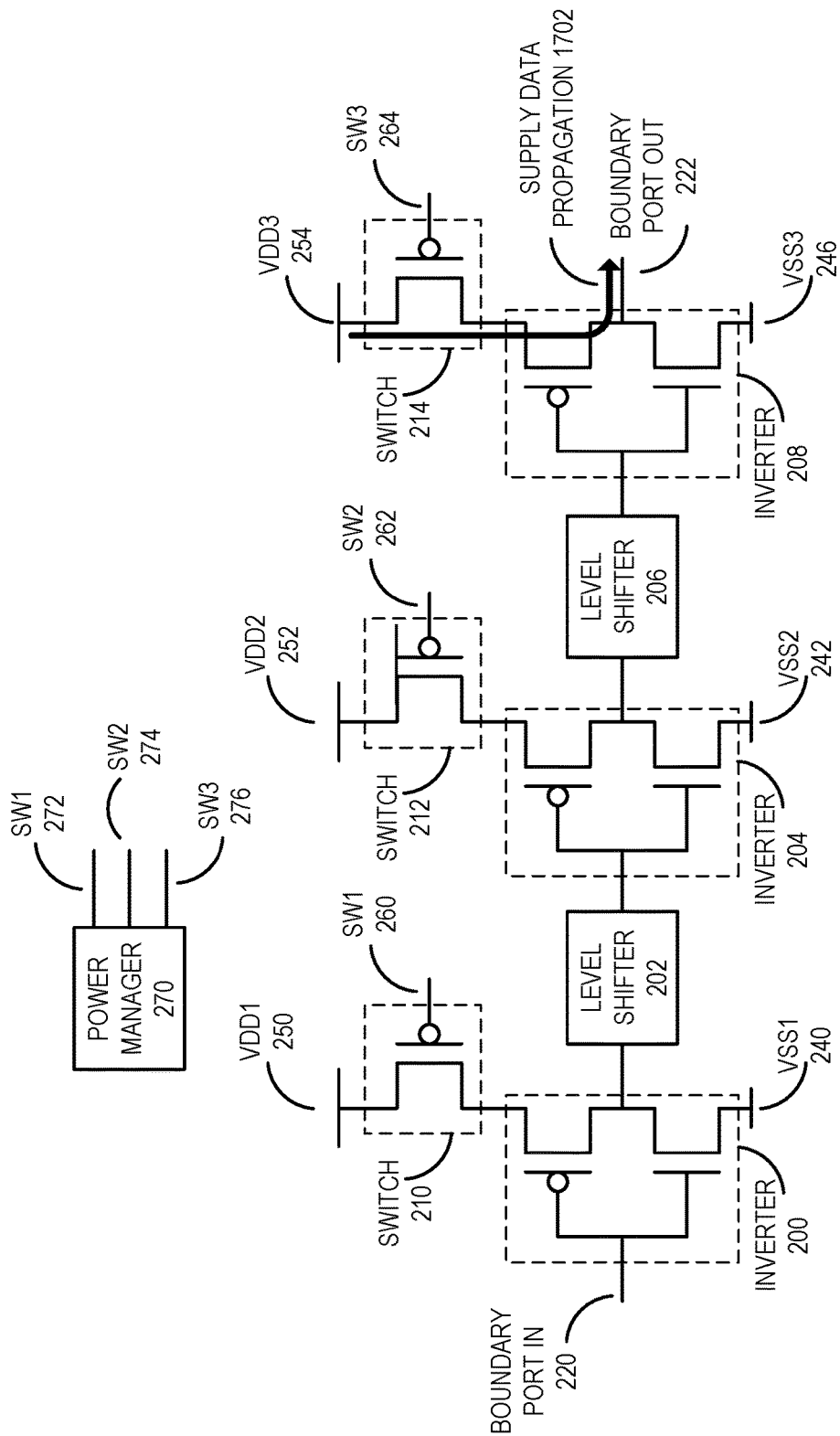
FIG. 17 is an example of propagating supply data through a portion of the analog schematic of FIG. 2.

FIG. 17 is an example of propagating supply data 1702 through a portion of the analog schematic of FIG. 2. Power supply data, such as VDD3 254, is received as part of pin voltage data 150 as shown in FIG. 1. An analog circuit simulator has sufficient information about the operational characteristics of the circuit components, such as the transistor of switch 214 and the p-type transistor of inverter 208, to electrically connect the terminals of the source and drain of the transistor of switch 214 and the p-type transistor of inverter 208. Such possible electrical connection between nodes informs the analog circuit simulator 110 to allow the propagation of supply data and ground data through the transistor. Supply data propagator 118 of analog circuit simulator 110 propagates power supply data VDD3 through switch 214, through the p-type transistor of inverter 208, and to boundary port out 222.

FIG. 18 is an excerpt from an example of an electrical node table generated from propagating supply data through a portion of the analog schematic in FIG. 17. The power-related connectivity data of boundary port out includes power supply data VDD3 and ground data VSS3. Propagation of power supply data VDD3 was discussed in connection with FIG. 17. In addition, ground data such as VSS3 246, is received as part of pin voltage data 150 as shown in FIG. 1. Ground data propagator 119 of analog circuit simulator 110 propagates ground data VSS3 through the n-type transistor of inverter 208 to boundary port out 222.

FIG. 19 is an excerpt of an example of power-related data 108 characterizing the mixed-signal design that includes the analog schematic of FIG. 17. Commands such as set_macro_model, create_power_domain, end_macro_model, set_instance, and update_power_domain are example instructions in power-related data 108 from FIG. 1 that comply with a power intent specification format. Power-related data module 120 parses the excerpt of power-related data of FIG. 19 to extract supply data 136 such as VDD3, ground data such as VSS3, port data 142 such as boundary port out 222, power domain data 132 such PD3 with power supply VDD3, and the like. Power-related connectivity data 162 includes the node boundary port out having power supply data VDD3 and ground data VSS3.

The power-related connectivity data 160 discussed in connection with FIGS. 17-18 and the power-related connectivity data 162 discussed in connection with FIG. 19 are received by verification module 170. Verification module 170 determines that node boundary port out is consistent between power-related connectivity data 160 from the analog circuit simulator 110 and power-related connectivity data 162 from power-related data 108. With respect to node boundary port out, verification module 170 generates a favorable verification report as to power-related. Verification module 170 makes further determinations for other ports of the mixed-signal design 102.

Figures 20, 21:
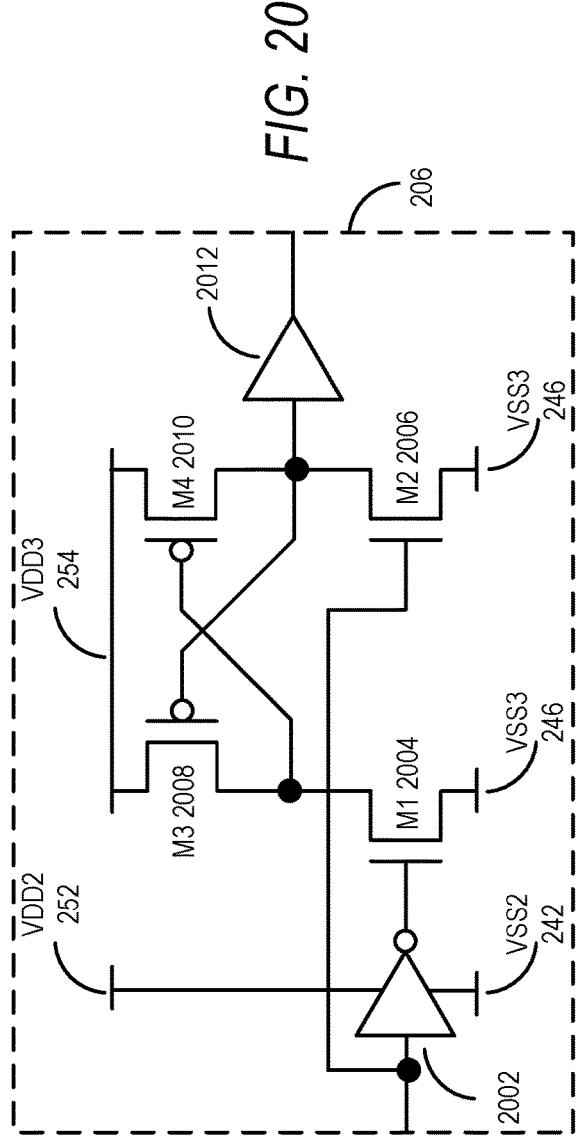
FIG. 20 is an example schematic of a level shifter portion of the analog schematic of FIG. 2.
FIG. 21 is an excerpt of a circuit component table generated from a portion of an analog schematic, with entries for circuit components in the level shifter of FIG. 20.

FIG. 20 is an example schematic of a level shifter portion of the analog schematic of FIG. 2. The input of level shifter 206 is coupled to the input of inverter 2002 and the gate of n-type transistor M2 2006. Inverter 2002 is coupled to power supply VDD2 252 and ground VSS2 242. Inverter 2002 has an output coupled to the gate of n-type transistor M1 2004. Two pairs of transistors are connected in series between power supply VDD3 254 and ground VSS3 246. A first pair of transistors connected in series between power supply VDD3 254 and ground VSS3 246 includes p-type transistor M3 2008 and n-type transistor M1 2004. A second pair of transistors connected in series between power supply VDD3 254 and ground VSS3 246 includes p-type transistor M4 2010 and n-type transistor M2 2006. The node in between p-type transistor M3 2008 and n-type transistor M1 2004 is electrically coupled to the gate of p-type transistor M4 2010. The node in between p-type transistor M4 2010 and n-type transistor M2 2006 is electrically coupled to the gate of p-type transistor M3 2008 and the input of buffer 2012. The output of buffer 2012 is the output of level shifter 206.

FIG. 21 is an excerpt of a circuit component table generated from a portion of an analog schematic, with entries for circuit components in the level shifter of FIG. 20. Supply data propagator 118 propagates power supply data VDD2 252 and VDD3 254 through level shifter 206. Ground data propagator 119 propagates ground data VSS2 242 and VSS3 246 level shifter 206. Supply data propagator 118 and ground data propagator 119 generate power-related connectivity data for n-type transistors M1 2004 and M2 2006, respectively shown as devices LS.M1 and LS.M2 in the circuit component table. The power-related connectivity data of transistor device LS.M1 includes power supply data VDD3 and ground data VSS3 for terminal 1, power supply data VDD2 and ground data VSS2 for terminal 2, and power supply data VDD3 and ground data VSS3 for terminal 3. The power-related connectivity data of transistor device LS.M2 includes power supply data VDD3 and ground data VSS3 for terminal 1, power supply data VDD2 and ground data VSS2 for terminal 2, and power supply data VDD3 and ground data VSS3 for terminal 3.

In one embodiment, verification module 170 identifies transistor devices LS.M1 and LS.M2 as each having multiple terminals with a difference in power supply data (in this case, power supply VDD2 at one terminal and VDD3 at another terminal). Verification module 170 determines that transistor devices LS.M1 and LS.M2 are both part of a level shifter, such that the electrical coupling of transistor devices LS.M1 and LS.M2 to multiple power domains, as determined by analog circuit simulator 110, is consistent with power-related data 108.

In another embodiment, verification module 170 identifies level shifter 206, and then confirms that level shifter 206 includes at least one transistor in the circuit component table with at least two terminals having a difference in power supply data. Each of transistor devices LS.M1 and LS.M2 has multiple terminals with a difference in power supply data (in this case, power supply VDD2 at one terminal and VDD3 at another terminal). So transistor device LS.M1 is sufficient for verification module 170 to determine that the level shifter 206 declared in power-related data 108 is consistent with the results of analog circuit simulator 110 that transistor device LS.M1 has multiple terminals with a difference in power supply data. Also, transistor device LS.M2 is sufficient for verification module 170 to determine that the level shifter 206 declared in power-related data 108 is consistent with the results of analog circuit simulator 110 that transistor device LS.M2 has multiple terminals with a difference in power supply data.

Figure 22:
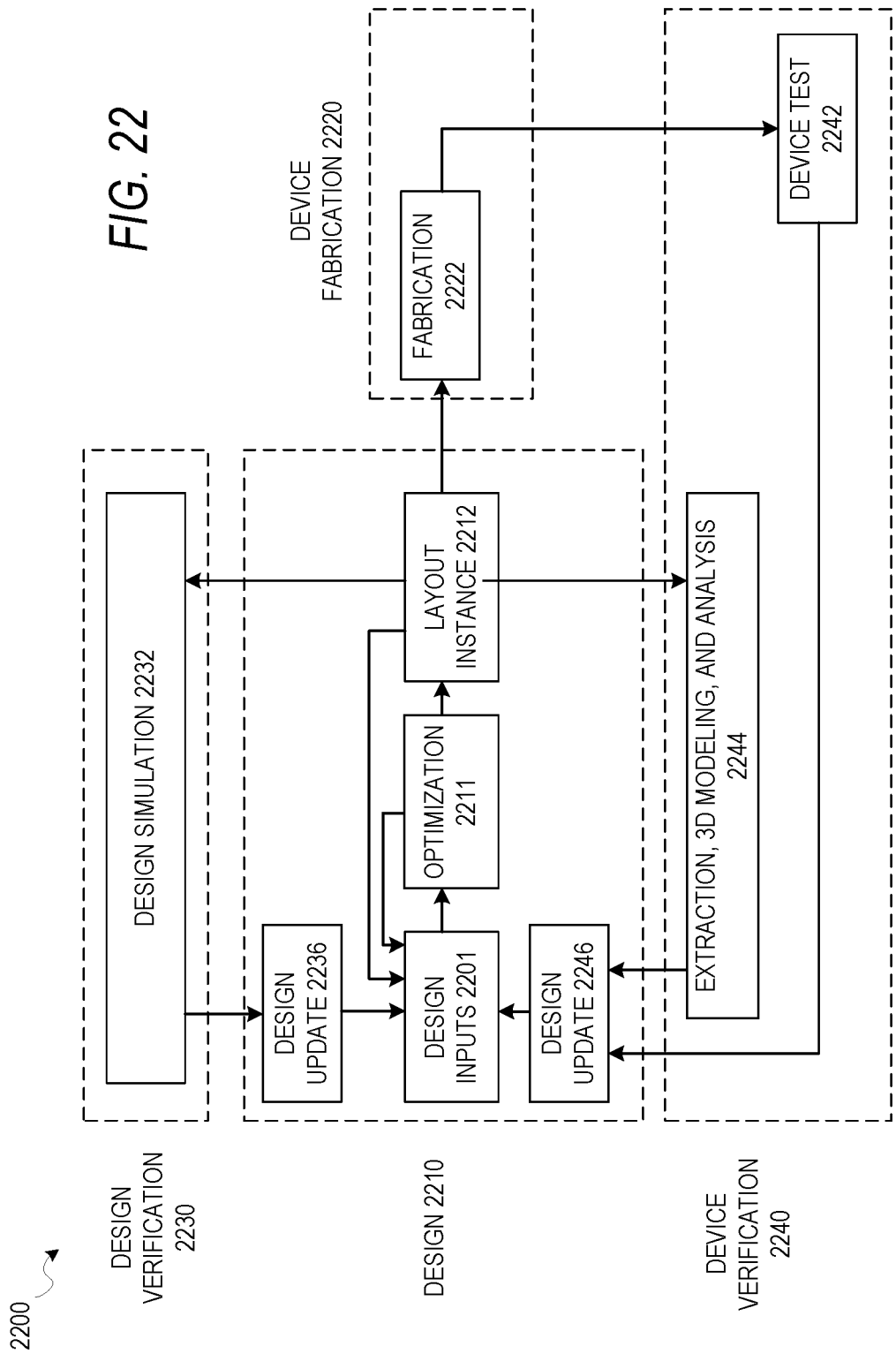
FIG. 22 is a diagram illustrating one possible design process flow for low power verification for mixed signal circuit designs, according to some example embodiments.

FIG. 22 is a diagram illustrating one possible design process flow for low power verification for mixed signal circuit designs, according to some example embodiments. As illustrated, the overall design flow 2200 includes a design phase 2210, a device fabrication phase 2220, a design verification phase 2230, and a device verification phase 2240. The design phase 2210 involves an initial design input operation 2201 where the basic elements and functionality of a device are determined, as well as revisions based on various analyses and optimization of a circuit design. This design input operation 2201 is where instances of an EDA circuit design file are used in the design and any additional circuitry is selected. The initial strategy, tactics, and context for the device to be created are also generated in the design input operation 2201, depending on the particular design algorithm to be used.

In some embodiments, design input operation 2201 includes creation and/or access of the mixed-signal design including an analog circuit design and a digital circuit design, along with power-related data that expresses a power intent specification.

After design inputs are used in the design input operation 2201 to generate a circuit layout, and any optimization operations 2211 are performed, a layout is generated in the layout instance 2212. The layout describes the physical layout dimensions of the device that match the design inputs. This layout may then be used in the device fabrication operation 2222 to generate a device, or additional testing and design updates may be performed using designer inputs or automated updates based on design simulation 2232 operations or extraction, three-dimensional (3D) modeling, and analysis 2244 operations.

In some embodiments, design simulation 2232 operations use an analog simulator to generate power-related connectivity data. In some embodiments, in the design verification phase, a verification module automatically determines whether the mixed-signal design satisfies the low power specification as expressed in the power-related data characterizing the mixed-signal design.

Once the device is generated, the device can be tested as part of device test 2242 operations, and layout modifications generated based on actual device performance.

Design updates 2236 from the design simulation 2232, design updates 2246 from the device test 2242 or the 3D modeling and analysis 2244 operations, or the design input operation 2201 may occur after an initial layout instance 2212 is generated. In various embodiments, whenever design inputs are used to update or change an aspect of a circuit design, a timing analysis and optimization operation 2211 may be performed.

Figure 23:
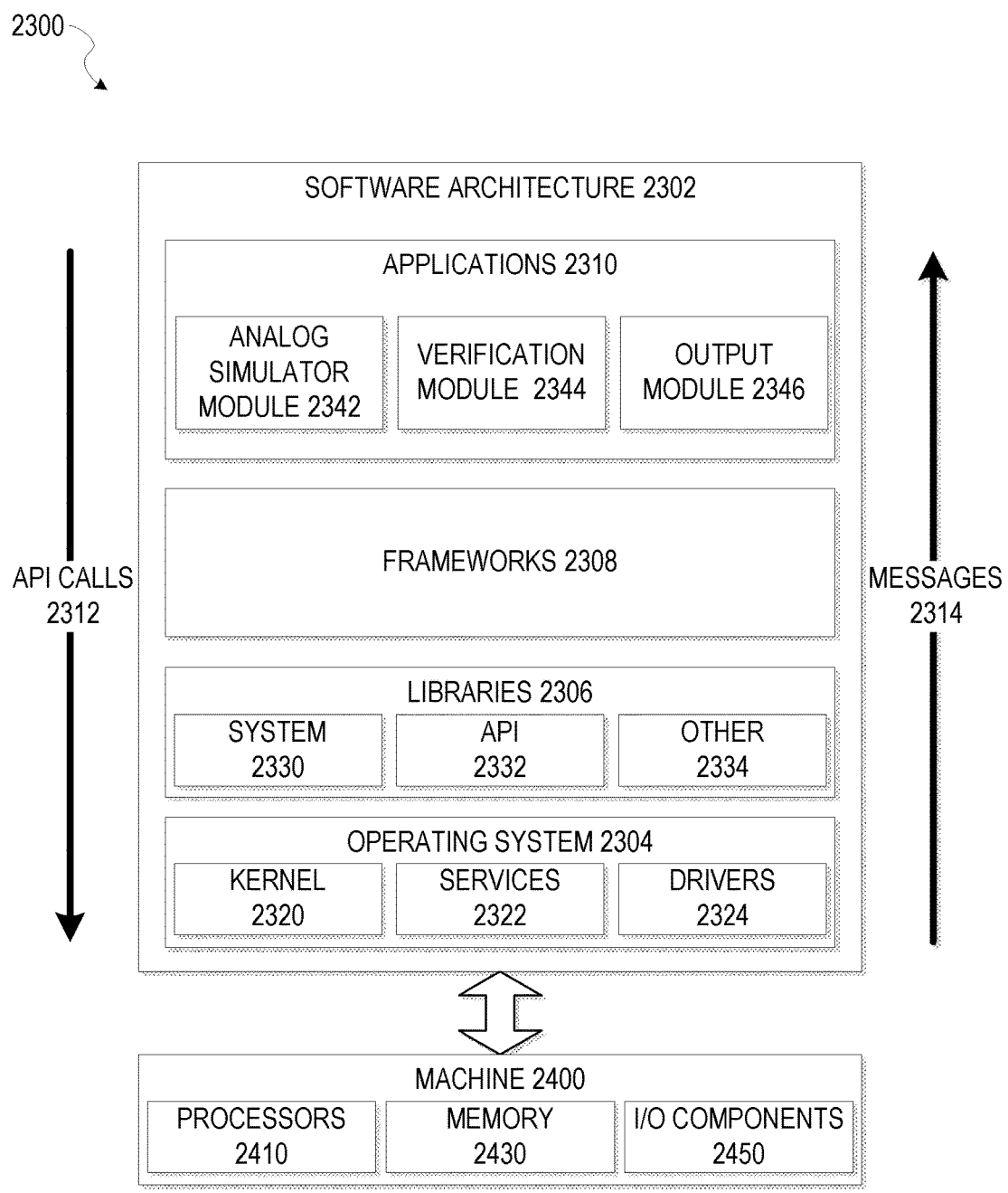
FIG. 23 is a block diagram illustrating an example of a software architecture that may be operating on an EDA computer and used to perform low power verification for mixed signal circuit designs, according to some example embodiments.

FIG. 23 is a block diagram 2300 illustrating an example of a software architecture 2302 that operating on an EDA computer and used to perform low power verification for mixed signal circuit designs according to implement any of the methods described herein. Aspects of software architecture 2302 are, in various embodiments, used to generate power-related connectivity data and to determine consistency between different versions of power-related connectivity data to verify circuit designs, with physical devices generated using these circuit designs.

FIG. 23 is merely a non-limiting example of a software architecture 2302, and it will be appreciated that many other architectures can be implemented to facilitate the functionality described herein. In various embodiments, the software architecture 2302 is implemented by hardware such as machine 2400 that includes processors 2410, memory 2430, and input/output (I/O) components 2450. In this example, the software architecture 2302 can be conceptualized as a stack of layers where each layer may provide a particular functionality. For example, the software architecture 2302 includes layers such as an operating system 2304, libraries 2306, frameworks 2308, and applications 2310. Operationally, the applications 2310 invoke application programming interface (API) calls 2312 through the software stack and receive messages 2314 in response to the API calls 2312, consistent with some embodiments. In various embodiments, any client device, server computer of a server system, or any other device described herein may operate using elements of software architecture 2302. An EDA computing device described herein may additionally be implemented using aspects of the software architecture 2302, with the software architecture 2302 adapted for operating to generate power-related connectivity data and to determine consistency between different versions of power-related connectivity data in any manner described herein.

In one embodiment, an EDA application of applications 2310 generates power-related connectivity data via, and determines consistency between, different versions of power-related connectivity data according to embodiments described herein using various modules within software architecture 2302. For example, in one embodiment, an EDA computing device similar to machine 2400 includes memory 2430 and one or more processors 2410. The processors 2410 implement analog simulator module 2342 to generate power-related connectivity data for an analog portion of a mixed-signal integrated circuit design. The processors 2330 also include verification module 2344 to determine consistency between different versions of power-related connectivity data and to generate reports on the result of verification. Processor implemented output module 2346 may then be used to update a display the verification report.

In various other embodiments, rather than being implemented as modules of one or more applications 2310, some or all of modules 2342, 2344, and 2346 may be implemented using elements of libraries 2306 or operating system 2304.

In various implementations, the operating system 2304 manages hardware resources and provides common services. The operating system 2304 includes, for example, a kernel 2320, services 2322, and drivers 2324. The kernel 2320 acts as an abstraction layer between the hardware and the other software layers, consistent with some embodiments. For example, the kernel 2320 provides memory management, processor management (e.g., scheduling), component management, networking, and security settings, among other functionality. The services 2322 can provide other common services for the other software layers. The drivers 2324 are responsible for controlling or interfacing with the underlying hardware, according to some embodiments. For instance, the drivers 2324 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 2306 provide a low-level common infrastructure utilized by the applications 2310. The libraries 2306 can include system libraries 2330 such as libraries of analog, digital, and power-management blocks for use in an EDA environment or other libraries that can provide functions such as memory allocation functions, string manipulation functions, mathematic functions, and the like. In addition, the libraries 2306 can include API libraries 2332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic content on a display), database libraries (e.g., SQLite to provide various relational database functions), web libraries (e.g., WebKit to provide web browsing functionality), and the like. The libraries 2306 may also include other libraries 2334.

The software frameworks 2308 provide a high-level common infrastructure that can be utilized by the applications 2310, according to some embodiments. For example, the software frameworks 2308 provide various graphic user interface (GUI) functions, high-level resource management, high-level location services, and so forth. The software frameworks 2308 can provide a broad spectrum of other APIs that can be utilized by the applications 2310, some of which may be specific to a particular operating system 2304 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files and viewdefinition files are examples that may operate within a software architecture 2302, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 2400 including processors 2410), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 2400, but deployed across a number of machines 2400. In some example embodiments, the processors 2410 or processor-implemented modules are located in a single geographic location (e.g., within a home environment, an office environment, or a server farm). In other example embodiments, the processors or processor-implemented modules are distributed across a number of geographic locations.

Figure 24:
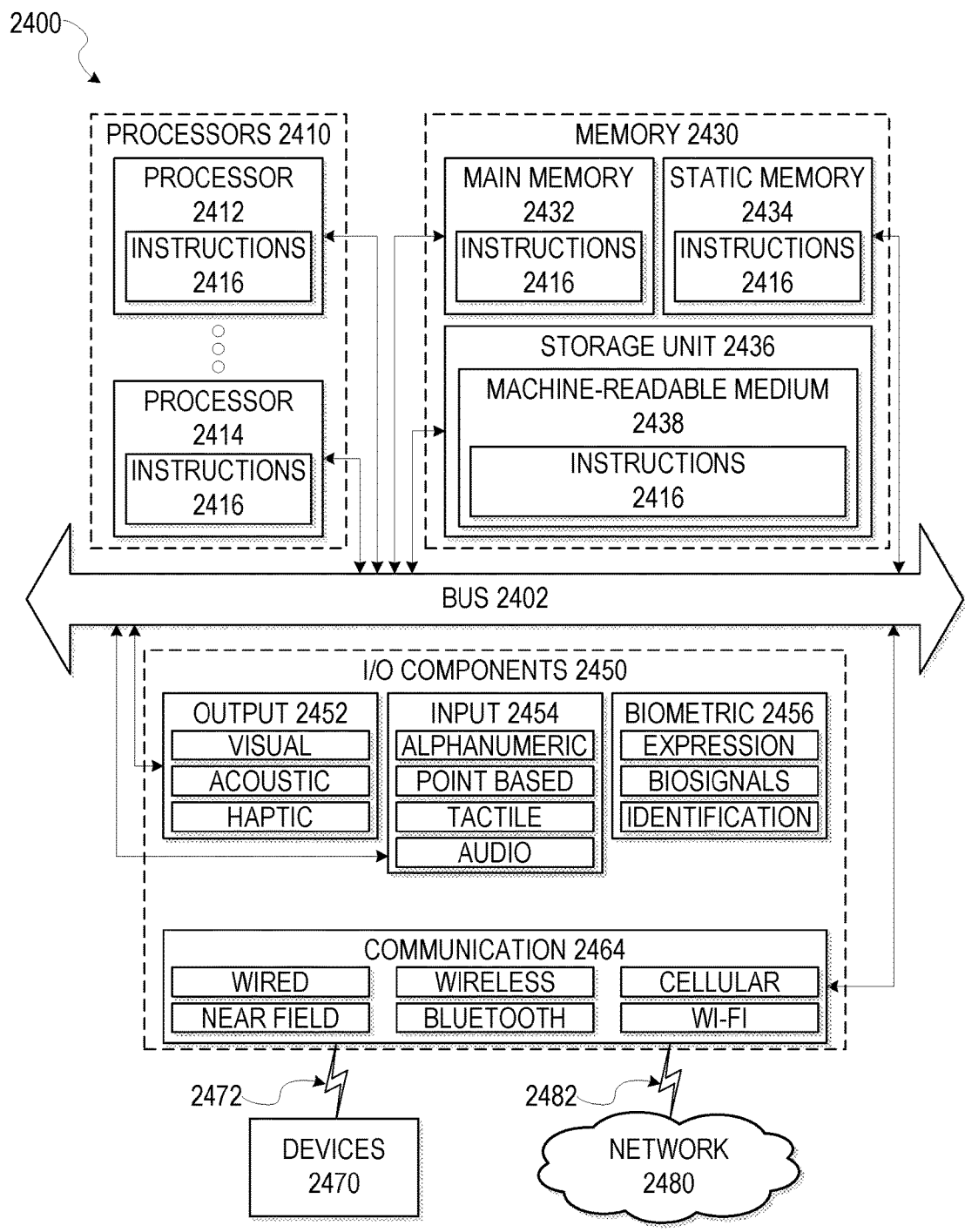
FIG. 24 is a diagrammatic representation of a machine in the form of a computer system within which a set of instructions are executable, causing the machine to perform low power verification for mixed signal circuit designs according to some example embodiments.

FIG. 24 is a diagrammatic representation of a machine 2400 in the form of a computer system within which a set of instructions are executable, causing the machine to perform low power verification for mixed signal circuit designs according to some example embodiments discussed herein. FIG. 24 shows components of the machine 2400, which is, according to some embodiments, able to read instructions from a machine-readable medium (e.g., a machine-readable storage medium) and perform any one or more of the methodologies discussed herein. Specifically, FIG. 24 shows a diagrammatic representation of the machine 2400 in the example form of a computer system, within which instructions 2416 (e.g., software, a program, an application, an applet, an app, or other executable code) causing the machine 2400 to perform any one or more of the methodologies discussed herein are executable. In alternative embodiments, the machine 2400 operates as a standalone device or can be coupled (e.g., networked) to other machines. In a networked deployment, the machine 2400 operates in the capacity of a server machine or a client machine in a server-client network environment, or as a peer machine in a peer-to-peer (or distributed) network environment. Examples of the machine 2400 are a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 2416, sequentially or otherwise, that specify actions to be taken by the machine 2400. Further, while only a single machine 2400 is illustrated, the term "machine" also includes a collection of machines 2400 that individually or jointly execute the instructions 2416 to perform any one or more of the methodologies discussed herein.

In various embodiments, the machine 2400 comprises processors 2410, memory 2430, and I/O components 2450, which are configurable to communicate with each other via a bus 2402. In an example embodiment, the processors 2410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 2412 and a processor 2414 that are able to execute the instructions 2416. In one embodiment the term "processor" includes multi-core processors 2410 that comprise two or more independent processors 2412, 2414 (also referred to as "cores") that are able to execute instructions 2416 contemporaneously. Although FIG. 24 shows multiple processors 2410, in another embodiment the machine 2400 includes a single processor 2412 with a single core, a single processor 2412 with multiple cores (e.g., a multi-core processor 2412), multiple processors 2410 with a single core, multiple processors 2410 with multiples cores, or any combination thereof.

The memory 2430 comprises a main memory 2432, a static memory 2434, and a storage unit 2436 accessible to the processors 2410 via the bus 2402, according to some embodiments. The storage unit 2436 can include a machine-readable medium 2438 on which are stored the instructions 2416 embodying any one or more of the methodologies or functions described herein. The instructions 2416 can also reside, completely or at least partially, within the main memory 2432, within the static memory 2434, within at least one of the processors 2410 (e.g., within the processor's cache memory), or any suitable combination thereof, during execution thereof by the machine 2400. Accordingly, in various embodiments, the main memory 2432, the static memory 2434, and the processors 2410 are examples of machine-readable media 2438.

As used herein, the term "memory" refers to a machine-readable medium 2438 able to store data volatilely or non-volatilely and may be taken to include, but not be limited to, random-access memory (RAM), read-only memory (ROM), buffer memory, flash memory, and cache memory. While the machine-readable medium 2438 is shown, in an example embodiment, to be a single medium, the term "machine-readable medium" includes a single medium or multiple media (e.g., a centralized or distributed database, or associated caches and servers) storing the instructions 2416. The term "machine-readable medium" also includes any medium, or combination of multiple media, that is capable of storing instructions (e.g., instructions 2416) for execution by a machine (e.g., machine 2400), such that the instructions 2416, when executed by one or more processors of the machine 2400 (e.g., processors 2410), cause the machine 2400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" includes, but is not limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 2450 include a wide variety of components to receive input, provide output, produce output, transmit information, exchange information, capture measurements, and so on. In general, the I/O components 2450 can include many other components that are not shown in FIG. 24. The I/O components 2450 are grouped according to functionality merely for simplifying the following discussion, and the grouping is in no way limiting. In various example embodiments, the I/O components 2450 include output components 2452, input components 2454, and biometric components 2456. The output components 2452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2454 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. In various embodiments, EDA outputs are used to generate updates and changes to a circuit design, and once a final closure of timing with all associated timing thresholds and design requirements are met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication is implementable using a wide variety of technologies. The I/O components 2450 may include communication components 2464 operable to couple the machine 2400 to a network 2480 or devices 2470 via a coupling 2482 and a coupling 2472, respectively. For example, the communication components 2464 include a network interface component or another suitable device to interface with the network 2480. In further examples, communication components 2464 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 2470 may be another machine or any of a wide variety of peripheral devices (e.g., a peripheral device coupled via a USB).

Transmission Medium

In various example embodiments, one or more portions of the network 2480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 2480 or a portion of the network 2480 may include a wireless or cellular network, and the coupling 2482 may be a Code Division Multiple Access (CDMA) connection, a Global System for Mobile communications (GSM) connection, or another type of cellular or wireless coupling. In this example, the coupling 2482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 2438 is non-transitory (in other words, not having any transitory signals) in that it does not embody a propagating signal. However, labeling the machine-readable medium 2438 "non-transitory" should not be construed to mean that the medium 2438 is incapable of movement; the medium 2438 should be considered as being transportable from one physical location to another. Additionally, since the machine-readable medium 2438 is tangible, the medium 2438 is a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense. The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
performing, by one or more processors of an electronic design automation (EDA) computing device, an EDA verification for a mixed-signal design for an integrated circuit, the mixed-signal design including both an analog circuit portion and a digital circuit portion, the performing including:
accessing, by the one or more processors, an analog design schematic of the analog circuit portion in the mixed-signal design;
generating, by the one or more processors, a first version of power-related connectivity data from the analog design schematic of the analog circuit portion in the mixed-signal design by using an analog circuit simulator of the EDA computing device to propagate power supply data through the analog design schematic; and
determining, by the one or more processors, consistency between the first version of power-related connectivity data from the analog design schematic of the analog circuit portion in the mixed-signal design and a second version of power-related connectivity data from power-related data characterizing the mixed-signal design.

2. The method of claim 1, wherein the power-related data characterizing the mixed-signal design follows at least one of Common Power Format (CPF), Unified Power Format (UPF), and IEEE-1801.

3. The method of claim 1, wherein
the propagating the power supply data through the analog design schematic of the analog circuit portion comprises iteratively performing:
propagating the power supply data from a first terminal of a particular circuit component in the analog design schematic to a second terminal of the particular circuit component in the analog design schematic; and
propagating the power supply data from the second terminal of the particular circuit component in the analog design schematic to any circuit component in the analog design schematic having a first terminal at a same electrical node as the second terminal of the particular circuit component.

4. The method of claim 3, further comprising:
generating an electrical node table identifying a plurality of electrical nodes and the power supply data that propagated through respective electrical nodes of the plurality of electrical nodes in the electrical node table.

5. The method of claim 3, further comprising:
generating a circuit component table identifying a plurality of circuit components, a plurality of terminals of respective circuit components of the plurality of circuit components, and the power supply data that propagated through respective terminals of the plurality of terminals of the respective circuit components of the plurality of circuit components.

6. The method of claim 5, further comprising:
identifying a first circuit component of the plurality of circuit components in the circuit component table having at least two terminals with a difference in the power supply data; and
determining whether the first circuit component is part of a level shifter cell.

7. The method of claim 5, further comprising:
identifying a first level shifter cell based on the analog design schematic; and
determining whether the first level shifter cell comprises at least one circuit component in the circuit component table having at least two terminals with a difference in the power supply data.

8. The method of claim 1, wherein the power-related data characterizing the mixed-signal design comprises:
a plurality of power domains having a set of power switching characteristics for a corresponding part of the mixed-signal design, the set of power switching characteristics including power supply data and ground data for the corresponding part of the mixed-signal design.

9. The method of claim 1, wherein the generating the first version of power-related connectivity data comprises:
propagating ground data through the analog design schematic of the analog circuit portion, by iteratively performing:
propagating the ground data from a first terminal of a particular circuit component in the analog design schematic to a second terminal of the particular circuit component in the analog design schematic; and
propagating the ground data from the second terminal of the particular circuit component in the analog design schematic to any circuit component in the analog design schematic having a first terminal at a same electrical node as the second terminal of the particular circuit component.

10. The method of claim 1, wherein performing the EDA verification for the mixed-signal design for the integrated circuit comprises:
generating a report about either the consistency or a lack of the consistency between the first version of power-related connectivity data from the analog design schematic of the analog circuit portion in the mixed-signal design and the second version of power-related connectivity data from power-related data characterizing the mixed-signal design.

11. A non-transitory computer-readable medium embodying instructions that, when executed by one or more processors, cause the one or more processors to perform operations comprising:
performing an electronic design automation (EDA) verification for a mixed-signal design for an integrated circuit, the mixed-signal design including both an analog circuit portion and a digital circuit portion, the performing including:
accessing the analog circuit portion in the mixed-signal design, and power-related data characterizing the mixed-signal design;
generating a first version of power-related connectivity data from an analog design schematic of the analog circuit portion in the mixed-signal design by using an analog circuit simulator of the EDA to propagate power supply data through the analog design schematic; and
determining consistency between different versions of a plurality of versions of power-related connectivity data characterizing the mixed-signal design, the plurality of versions of power-related connectivity data including:
the first version of power-related connectivity data from the analog circuit portion in the mixed-signal design; and
a second version of power-related connectivity data from the power-related data characterizing the mixed-signal design.

12. The non-transitory computer-readable medium of claim 11, wherein the power-related data characterizing the mixed-signal design follows at least one of Common Power Format (CPF) and Unified Power Format (UPF).

13. The non-transitory computer-readable medium of claim 11, wherein the generating the first version of power-related connectivity data comprises:
propagating power supply data through the analog design schematic of the analog circuit portion, by iteratively performing:
propagating the power supply data from a first terminal of a particular circuit component in the analog design schematic to a second terminal of the particular circuit component in the analog design schematic; and
propagating the power supply data from the second terminal of the particular circuit component in the analog design schematic to any circuit component in the analog design schematic having a first terminal at a same electrical node as the second terminal of the particular circuit component.

14. The non-transitory computer-readable medium of claim 13, further comprising:
generating an electrical node table identifying a plurality of electrical nodes and the power supply data that propagated through respective electrical nodes of the plurality of electrical nodes in the electrical node table.

15. The non-transitory computer-readable medium of claim 13, further comprising:
generating a circuit component table identifying a plurality of circuit components, a plurality of terminals of respective circuit components of the plurality of circuit components, and the power supply data that propagated through respective terminals of the plurality of terminals of the respective circuit components of the plurality of circuit components.

16. The non-transitory computer-readable medium of claim 11, wherein the power-related data characterizing the mixed-signal design comprises:
a plurality of power domains having a set of power switching characteristics for a corresponding part of the mixed-signal design, the set of power switching characteristics including power supply data and ground data for the corresponding part of the mixed-signal design.

17. The non-transitory computer-readable medium of claim 11, wherein the generating the first version of power-related connectivity data comprises:
propagating ground data through the analog design schematic of the analog circuit portion, by iteratively performing:
propagating the ground data from a first terminal of a particular circuit component in the analog design schematic to a second terminal of the particular circuit component in the analog design schematic; and
propagating the ground data from the second terminal of the particular circuit component in the analog design schematic to any circuit components in the analog design schematic having a first terminal at a same electrical node as the second terminal of the particular circuit component.

18. The non-transitory computer-readable medium of claim 11, wherein performing the EDA verification for the mixed-signal design for the integrated circuit comprises:
generating a report about either the consistency or a lack of the consistency between the power-related connectivity data from the analog circuit portion in the mixed-signal design and power-related data characterizing the mixed-signal design.

19. An electric design automation (EDA) computing device comprising:
a memory;
one or more hardware processors coupled to the memory;
a processor implemented EDA module configured to perform:
initiating a EDA verification analysis for a mixed-signal design for an integrated circuit, the mixed-signal design including both an analog circuit portion and a digital circuit portion;
accessing processors, power-related data characterizing the mixed-signal design and the analog circuit portion in the mixed-signal design;
generating a first version of power-related connectivity data from an analog design schematic of the analog circuit portion in the mixed-signal design by using an analog circuit simulator of the EDA computing device to propagate power supply data through the analog design schematic; and
performing the verification analysis for a mixed-signal design based on a plurality of versions of power-related connectivity data characterizing the mixed-signal design, the plurality of versions including the first version based on the analog circuit portion in the mixed-signal design and a second version based on the power-related data characterizing the mixed-signal design.

* * * * *